(12) United States Patent
Gong et al.

(10) Patent No.: US 7,830,450 B2
(45) Date of Patent: Nov. 9, 2010

(54) FRAME SYNCHRONIZATION METHOD AND DEVICE UTILIZING FRAME BUFFER

(75) Inventors: Jin-Sheng Gong, Hsinchu (TW); Yu-Pin Chou, Miao- Li Hsien (TW); Hsu-Jung Tung, Kao-Hsiung (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 890 days.

(21) Appl. No.: 11/531,281

(22) Filed: Sep. 13, 2006

(65) Prior Publication Data

US 2008/0062185 A1    Mar. 13, 2008

(51) Int. Cl.
*H04N 7/01* (2006.01)
(52) U.S. Cl. .................. 348/459; 348/441; 345/547
(58) Field of Classification Search .................. 345/213, 345/545, 560; 348/441, 547
See application file for complete search history.

(56) References Cited

U.S. PATENT DOCUMENTS

| 7,359,007 B2* | 4/2008 | Wu ............................ 348/581 |
| 2003/0164897 A1* | 9/2003 | Chen et al. .................. 348/459 |
| 2005/0024369 A1* | 2/2005 | Xie ............................. 345/547 |
| 2007/0177677 A1* | 8/2007 | Thomsen ............... 375/240.26 |

\* cited by examiner

*Primary Examiner*—Ulka Chauhan
*Assistant Examiner*—Donna J Ricks
(74) *Attorney, Agent, or Firm*—Winston Hsu; Scott Margo; Min-Lee Teng

(57) ABSTRACT

A frame synchronization method includes: temporarily storing input data of at least one source frame in a frame buffer according to an input time sequence; generating an output time sequence according to the input time sequence and a delay time; generating output data of a destination frame according to the input data of the source frame; and outputting the output data of the destination frame according to an output time sequence; wherein an average frame rate of the source frame is substantially the same as that of the destination frame.

19 Claims, 3 Drawing Sheets

FRAME SYNCHRONIZATION METHOD AND DEVICE UTILIZING FRAME BUFFER

BACKGROUND OF THE INVENTION

1. Field of the Invention

The present invention relates to display devices, and more particularly, to frame synchronization methods and devices.

2. Description of the Prior Art

When a frame rate of input frames differs from a frame rate of output frames, or when input frames of two paths having different frame rates respectively should be outputted with a common frame rate, frame rate conversion is required. Normally in a monitor, a frame rate conversion method for performing the frame rate conversion mentioned above needs a frame buffer for temporarily storing frame data, and then an image processor performs image processing of the frame data.

According to the prior art, however, some problems typically occur during the frame rate conversion as described in the following.

One problem is the frame-tear problem, which means within frames displayed on the monitor, a portion of the displayed frames and another portion of the displayed frames respectively correspond to different frames of different time points. The frame-tear problem occurs because during a reading operation of frame data temporarily stored in the frame buffer, the image processor first continuously reads a certain frame's data and then starts reading the next frame's data even if the next frame's data has not been stored in the frame buffer to replace the original frame data.

Another problem is a side effect of increasing the number of the frame buffer (e.g. two frame buffers corresponding to an input frame) to provide enough space for storing frame data and solving the above-mentioned frame-tear problem. The side effect of this revised frame rate conversion method is that when a frame rate of output frames is greater than a frame rate of input frames, some of the output frames should be outputted repeatedly. Conversely, when a frame rate of output frames is less than a frame rate of input frames, some of the output frames should be omitted. As a result, a video object (e.g. text) in a scrolling banner displayed on a monitor utilizing this method will appear to be moving at an unsteady speed. Furthermore, an additional material cost is required to implement this architecture since the volume of the frame buffer is increased.

Another method utilizes line buffers together with related control circuits to synchronize frame rates of input and output frames. This frame synchronization method has some implementation limitations.

One implementation limitation is that utilizing the related control circuits to control data synchronization is required, so as to prevent the line buffers from having problems such as data overflow or data underflow.

Another implementation limitation is that the format of the output video signal should approach a specific requirement since digital display devices from different manufacturers, for example, panels, have various requirements for the acceptable video signal format thereof, which may differ from manufacturer to manufacturer. If the output video signal does not meet the specific requirement of the panel (e.g. the pixel numbers of all horizontal lines are completely the same), it will not satisfy the requirements of all panels regarding the outputted format. As a result, the digital display device(s) (e.g. one of the panels) may not accept that the output video signal fails to meet the digital display device's require- ments for the video signal format, and therefore, may not be able to display the video signal.

Therefore, on one hand, although the conventional frame rate conversion method may adjust the frame rate during displaying, the unsteady moving speed problem exists. On the other hand, although the conventional frame synchronization method mentioned above may solve the unsteady moving speed problem, the conventional frame synchronization method is not able to change the frame rate during displaying. As a result, no matter which method is utilized for display control of the monitor displaying the frames, at least one problem exists. Therefore, to a user viewing the displayed frames, the displayed frames are quite unsteady.

SUMMARY OF THE INVENTION

It is therefore an objective of the claimed invention to provide frame synchronization methods and devices utilizing a frame buffer to solve the above-mentioned problem.

It is another objective of the claimed invention to provide a frame synchronization method. According to one embodiment of the claimed invention, the frame synchronization method comprises: temporarily storing input data of at least one source frame in a frame buffer according to an input time sequence; generating an output time sequence according to the input time sequence and a delay time; generating output data of a destination frame according to the input data of the source frame; and outputting the output data of the destination frame according to an output time sequence; wherein an average frame rate of the source frame is substantially the same as that of the destination frame.

It is another objective of the claimed invention to provide a frame synchronization device. According to one embodiment of the claimed invention, the frame synchronization device comprises: a time sequence generator generating an output time sequence according to a delay time and an input time sequence corresponding to at least one source frame; and a frame buffer, coupled to the time sequence generator, for temporarily storing input data of the source frame according to the input time sequence and outputting output data of a destination frame according to the output time sequence, wherein the output data is corresponding to the input data; wherein an average frame rate of the source frame is substantially the same as that of the destination frame.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
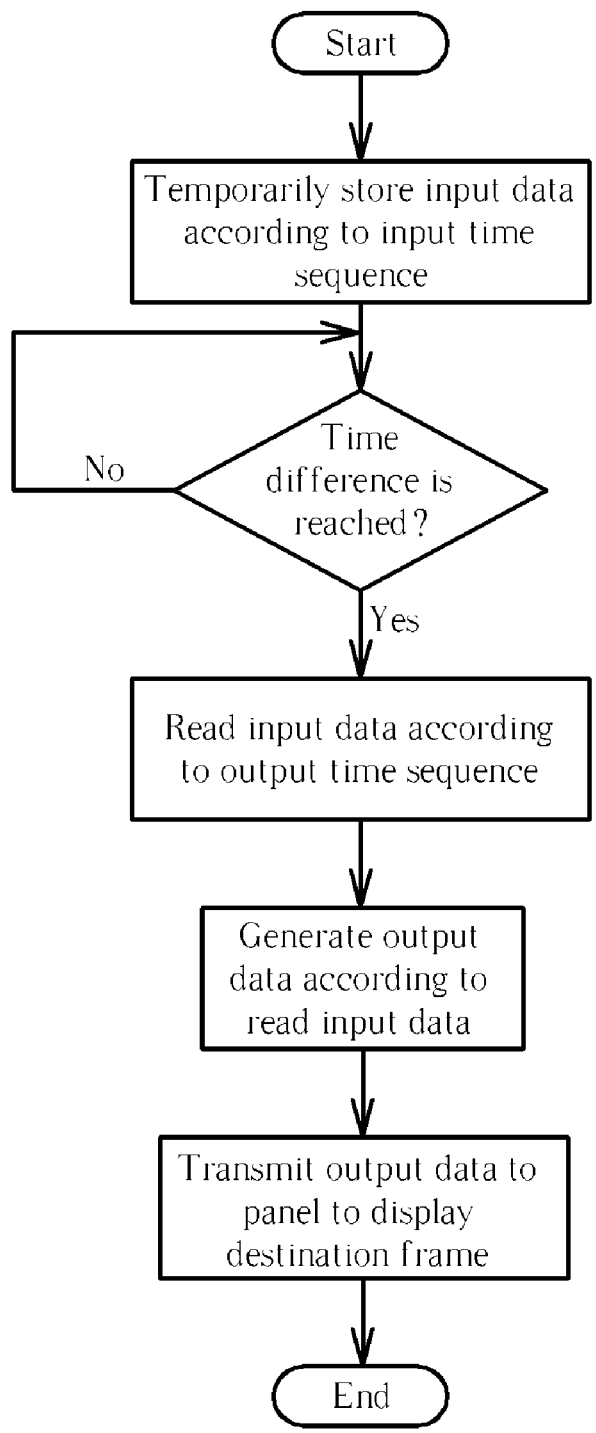
FIG. 1 is a flowchart of a frame synchronization method according to one embodiment of the present invention.
Figure 2:
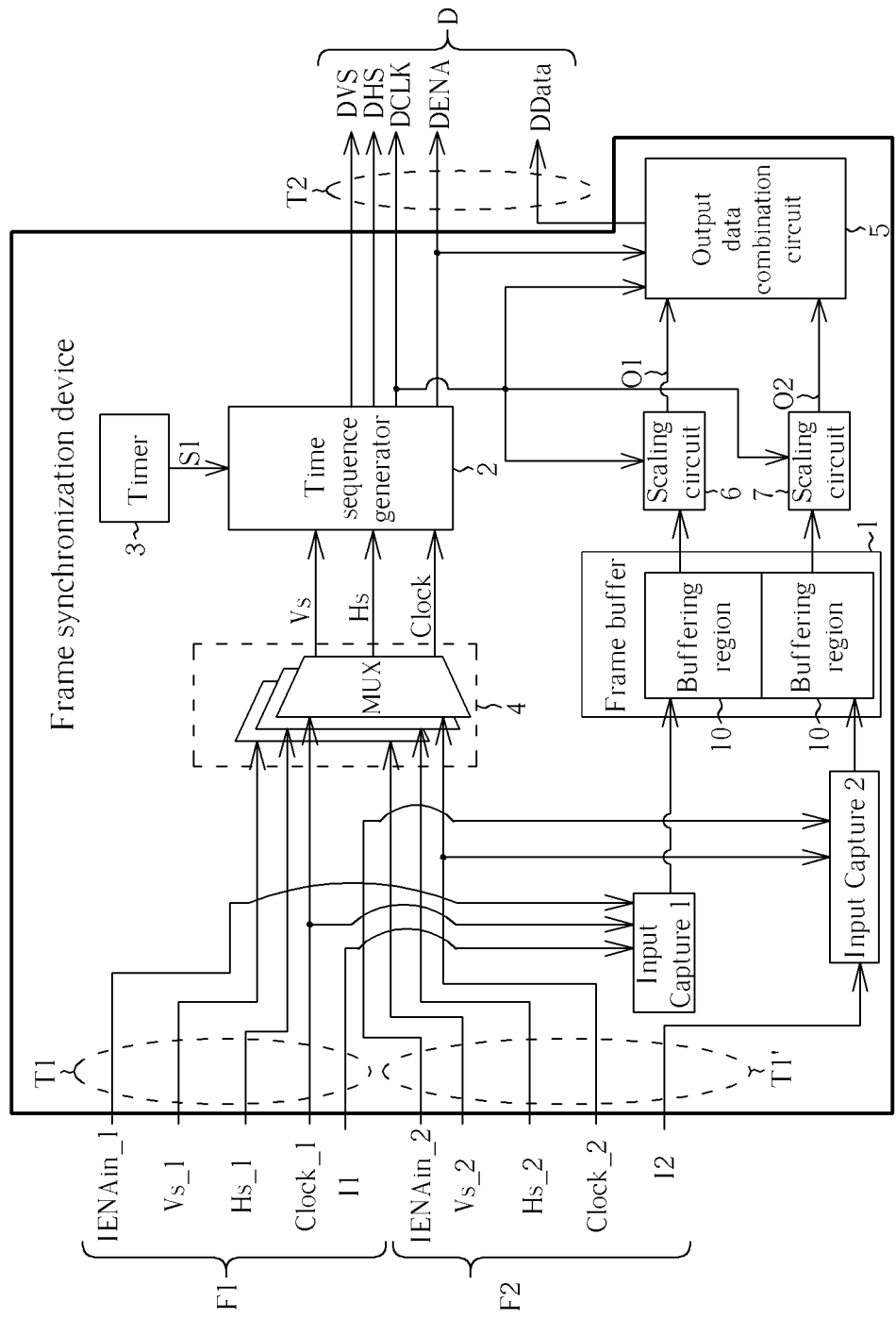
FIG. 2 is a diagram of a frame synchronization device according to one embodiment of the present invention.

The present invention provides frame synchronization methods and devices utilizing a frame buffer. Please refer to FIG. 1 and FIG. 2. FIG. 1 is a flowchart of a frame synchronization method according to one embodiment of the present invention. FIG. 2 is a diagram of a frame synchronization device according to one embodiment of the present invention.

The frame synchronization method shown in FIG. 1 can be applied to the frame synchronization device shown in FIG. 2. The frame synchronization method temporarily stores the input data I1 of each source frame F1 according to an input time sequence T1 of the source frame F1. According to the frame synchronization method, the temporarily stored input data I1 is read (or read out) according to an output time sequence T2 of a destination frame D corresponding to the source frame F1 to generate output data O1 of the destination frame D, wherein by controlling the output time sequence T2, the average frame rate of the source frame can be substantially the same as the average frame rate of the destination frame. As a result, the frame synchronization method may solve the frame-tear problem mentioned above without increasing the number of frame buffers, so a video object in frames moves steadily and can be displayed on any location with any size.

In the embodiment of the present invention, there is a time difference (delay time) S1 between the input time sequence T1 and the output time sequence T2, so after the input time sequence T1 starts, the frame synchronization method starts to temporarily store the input data I1, and after the input data I1 is temporarily entirely stored within the time difference S1 and after the time difference S1 goes by, the frame synchronization method generates the output time sequence T2, and starts reading the temporarily stored input data I1 according to the output time sequence T2 and processing the read input data I1 and further generates the output data O1 through up-scaling or down-scaling. As a result of repeated circular operations like this, the frame synchronization method may synchronize operations of the source frame F1 and the destination frame D since the time difference S1 makes the time of continuously temporarily storing the input data I1 equal to the time of generating the output data O1, so that the average frame rate of the source frame F1 and that of the destination frame D are the same.

According to one embodiment of the present invention, referring to FIG. 2 again, if a plurality of source frames F1 and F2 are supposed to be inputted for display, the frame synchronization method selects the time point when the input data I1 of one source frame F1 of the source frames F1 and F2 starts to be temporarily stored as the time point when the input time sequence T1 begins. In addition, after the input time sequence T1 begins, the frame synchronization method temporarily stores the input data I1 and I2 of all the source frames F1 and F2, and further sets the time interval for temporarily entirely storing the selected input data I1 as the time difference S1 (which can be referred to as the delay time). As a result, according to the input time sequence T1 together with the delay of the time difference S1 which is generated by the timer 3, the output time sequence T2 can be generated. According to the time point when the output time sequence T2 begins, the input data I1 and I2 of all the source frames F1 and F2 start to be read to generate the output data O1 and O2. After further processing the output data O1 and O2, the frame synchronization method generates a plurality of destination frames D corresponding to the source frames F1 and F2. The selected source frame F1 is the source frame having least influence on viewing quality for a viewer within the destination frames D since the viewer may accept problems such as the frame-tear problem or the unsteady moving speed problem due to some faster or slower destination frame within the destination frames D.

For example, if an SVGA signal of 85 Hz from a computer and a video signal of one of the PAL standard or the NTSC standard are both supposed to be displayed on the same monitor, the viewer typically prefers having a portion of the destination frames corresponding to the video signal without the frame-tear problem and the unsteady moving speed problem while the frame-tear problem and the unsteady moving speed problem occurring in another portion of the destination frames corresponding to the SVGA signal is acceptable. The reason why the viewer may accept these problems occurring in the portion of the destination frames corresponding to the SVGA signal is that the destination frames of the SVGA signal are not steady all the time. Typically, if a PC mouse is not moved, the cursor displayed on the monitor sometimes drifts.

According to the embodiment shown in FIG. 2, the frame synchronization device temporarily stores the input data I1 of each source frame F1 in a frame buffer 1 according to the input time sequence T1 of the respective source frame. Accordingly, the input data I1 temporarily stored in the frame buffer 1 is read (or read out) according to the output time sequence T2 of the destination frame D corresponding to the source frame F1 to generate the output data O1 of the destination frame D, so that the average frame rate of the source frame F1 can be substantially the same as the average frame rate of the destination frame D. As a result, the frame synchronization device may solve the frame-tear problem mentioned above without increasing the number of frame buffers, so a video object in frames moves steadily and can be displayed on any location with any size.

According to this embodiment, the output time sequence T2 is generated by a time sequence generator 2, where the time sequence generator 2 is connected to output terminals of the frame buffer 1 to provide the output control according to the output time sequence T2, so that at a time point of the output time sequence T2, the input data I1 temporarily stored in the frame buffer 1 can be read to generate the output data O1.

As shown in FIG. 2, the multiplexers 4 may select input signals Vs_1, Hs_1, and Clock_1 at the upper paths corresponding to the source frame F1 or input signals Vs_2, Hs_2, and Clock_2 at the lower paths corresponding to the source frame F2 as selected signals Vs, Hs, and Clock. In addition, the frame synchronization device of this embodiment comprises two scaling circuits 6 and 7 for scaling the data stored in the frame buffer 1 to generate the output data O1 and O2 of the destination frame D. According to another embodiment of the present invention, the scaling circuits 6 and 7 can be omitted if the up-scaling and down-scaling are not required.

Figure 3:
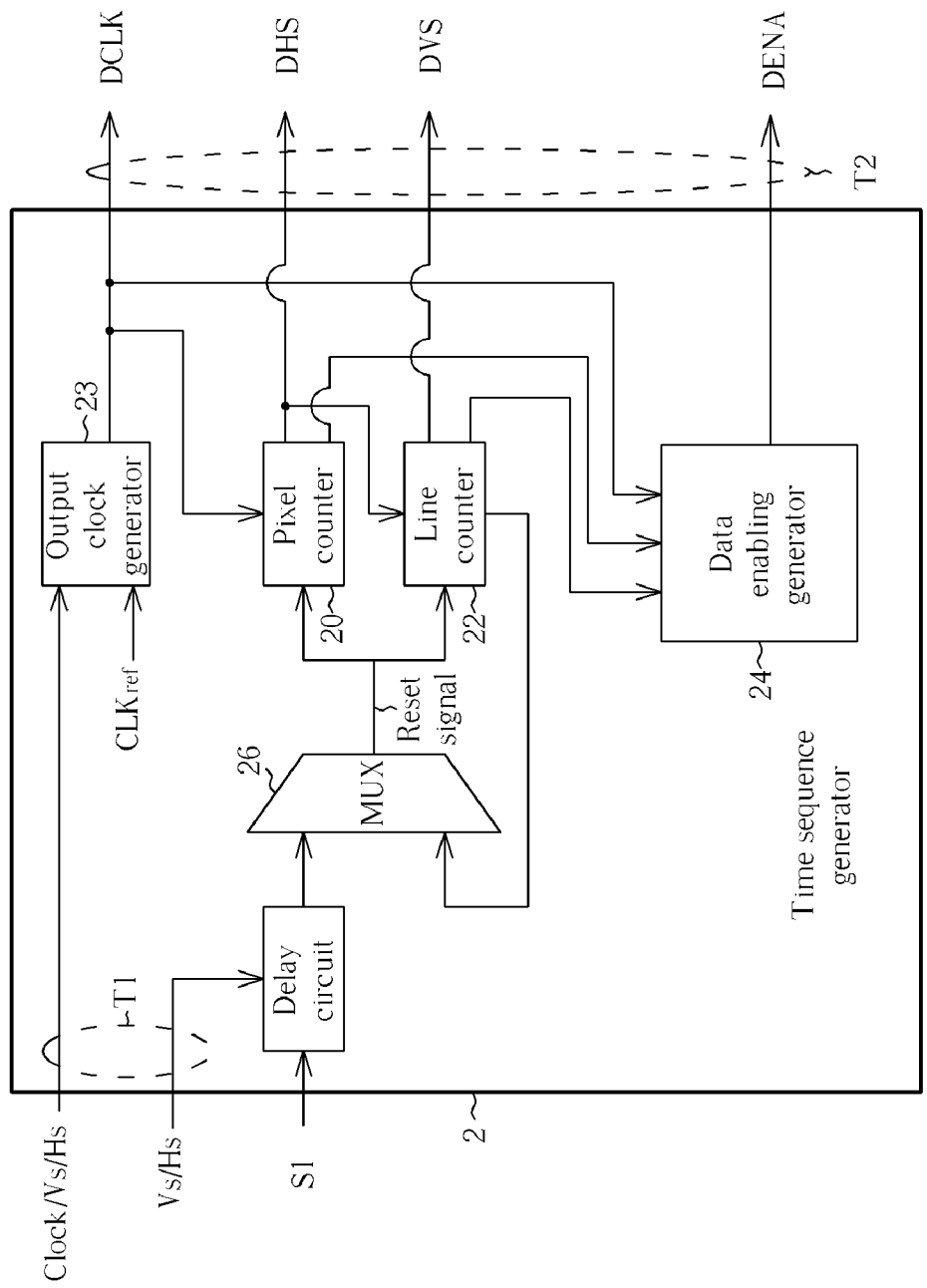
FIG. 3 is a diagram of a time sequence generator according to one embodiment of the present invention.

FIG. 3 is a diagram of a time sequence generator 2 according to one embodiment of the present invention, where the time sequence generator 2 shown in FIG. 3 can be applied to the embodiment shown in FIG. 2 with the coupling relationships between related components shown in FIG. 3. As shown in FIG. 3, the time sequence generator 2 comprises an output clock generator 23 (which is a PLL in this embodiment), a pixel counter 20, a line counter 22, and a data enabling generator 24. The pixel counter 20 is connected to the line counter 22 and the output clock generator 23, and the data enabling generator 24 is connected to the pixel counter 20, the line counter 22, and the output clock generator 23, so after the output clock generator 23 generates a display clock DCLK according to a reference clock $CLK_{ref}$ or the selected signal Clock or the selected vertical synchronization signal Vs or the selected horizontal synchronization signal Hs, the pixel counter 20 counts the number of pixels of a horizontal line of the destination frame D according to the display clock DCLK. After the pixel counter 20 counts to the last pixel of the horizontal line, the pixel counter 20 generates a display horizontal synchronization output signal DHS, and the line counter 22 counts once and resets the pixel counter 20 (to zero). As a result of repeated circular operations like this, after the line counter 22 completes counting the number of all the horizontal lines of the destination frame D to generate a display vertical synchronization output signal DVS, the line counter 22 is reset (to zero). The data enabling generator 24 generates a data enabling output signal DENA according to the display clock DCLK, and the counting results of the pixel counter 20 and the line counter 22. In addition, one of the display horizontal synchronization output signal DHS, the display vertical synchronization output signal DVS, and the data enabling output signal DENA can be generated in response to the output time sequence T2. According to a preferred implementation choice of this embodiment, it is easier to control the data enabling output signal DENA to match the output time sequence T2. The main reason why the data enabling output signal DENA is preferred is that the output data O1 together with the data enabling output signal DENA are outputted to a panel for displaying the destination frame D. It is easier to implement the time sequence control in this way than using other methods.

In the embodiment shown in FIG. 3, the time sequence generator 2 resets the pixel counter 20 and the line counter 22 (to zero) after the display vertical synchronization output signal DVS is generated. In addition, by utilizing the multiplexer 26 to select the upper path from the delay circuit, the time sequence generator 2 may reset the pixel counter 20 and the line counter 22 (to zero) according to the selected signal Vs or Hs or both. As shown in FIG. 3, the time sequence generator 2 may delay the input time sequence T1 (or T1') with the delay time S1 by delaying the selected signal Vs or Hs.

According to one embodiment, the time sequence generator 2 may first delay the input time sequence T1 (or T1') according to the delay time S1 to generate a delayed time sequence, and generate the output time sequence T2 according to the delayed time sequence. According to another embodiment, the time sequence generator 2 may first generate the output time sequence T2 according to the input time sequence T1 (or T1'), and delay the output time sequence T2 according to the delay time S1.

According to another preferred embodiment of the present invention, referring to FIG. 2 again, the frame synchronization device further comprises a multiplexer 4 connected to the time sequence generator 2. In addition to receiving the source frame F1, the multiplexer 4 is capable of further receiving other source frames in the same time such as the source frame F2, where the other source frames may have frame rates that differ from the frame rate of the source frame F1, and the other source frames such as the source frame F2 can be temporarily stored in the frame buffer 1 according to the input time sequence T1' thereof. As a result, the time sequence generator 2 only synchronizes the input data I1 of the source frame F1 and the output data O1 of the destination frame D. In other words, only the viewing quality of the destination frame D corresponding to the source frame F1 is maintained.

According to the other preferred embodiment mentioned above, the frame buffer 1 may comprise a plurality of buffering regions 10. The buffering regions 10 respectively match the source frames F1 and F2, where the input data I1 and I2 can be temporarily stored therein and can be read (read out) from the buffering regions 10 for further processing. Through scaling circuits (e.g. the scaling circuit 6 and the scaling circuit 7), the output data O1 and O2 can be respectively generated, and further sent into an output data combination circuit 5 for mixing to generate display data DData, so the panel displays the display data DData of the destination frame D.

According to another preferred embodiment of the present invention, the lower path of the multiplexer 26 illustrated in FIG. 3 is not needed, so the multiplexer 26 can be omitted, and the pixel counter 20 and the line counter 22 directly receive the reset signal from the delay circuit. In a preferred embodiment, the time difference (delay time) S1 is adjustable, so the output time sequence T2 is therefore adjustable. The architecture for adjusting the time difference S1 is not described in detail here since it can be varied according to different implementation choices, which are not the point to be focused on in this embodiment. Please note that by adjusting the time difference S1, the output video signal mentioned above may meet the specific requirement of the panel. For example, the pixel number of each horizontal line is even (regarding all pixels comprising visible pixels and invisible pixels in each line). In another example, the pixel numbers of all horizontal lines are completely the same (regarding all pixels comprising visible pixels and invisible pixels in each line).

According to another embodiment of the present invention, the scaling circuits (e.g. the scaling circuit 6 and the scaling circuit 7) can be omitted. For example, each of the input data I1 and I2 of the source frames F1 and F2 has been processed by up-scaling or down-scaling as mentioned above and then inputted into the frame synchronization device shown in FIG. 2, so the scaling circuits (e.g. the scaling circuit 6 and the scaling circuit 7) can be omitted.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A frame synchronization method, comprising:
   temporarily storing input data of at least one source frame in a frame buffer according to an input time sequence, wherein the source frame comprises a first input frame having a first time sequence and a second input frame having a second time sequence, and the step of temporarily storing the input data of the at least one source frame in the frame buffer according to the input time sequence further comprises:
      selecting one of the first and the second time sequences as the input time sequence;
   generating an output time sequence according to the input time sequence and a delay time;
   generating output data of a destination frame according to the input data of the source frame; and
   outputting the output data of the destination frame according to an output time sequence;
   wherein an average frame rate of the source frame is the same as that of the destination frame.

2. The frame synchronization method of claim 1, wherein the step of generating the output time sequence further comprises:
   generating the output time sequence according to the input time sequence; and
   delaying the output time sequence according to the delay time.

3. The frame synchronization method of claim 1, wherein the step of generating the output time sequence further comprises:
   delaying the input time sequence according to the delay time to generate a delayed time sequence; and
   generating the output time sequence according to the delayed time sequence.

4. The frame synchronization method of claim 1, wherein the delay time is controlled such that the input data of the source frame is temporarily entirely stored within the delay time.

5. The frame synchronization method of claim 1, wherein the step of generating the output data further comprises:
    generating first output data and second output data according to the input data of the first input frame and the second input frame, respectively; and
    combining the first output data and the second output data to generate the output data of the destination frame.

6. The frame synchronization method of claim 5, wherein the first input frame is corresponding to a video signal and the second input frame is corresponding to a signal from a computer.

7. The frame synchronization method of claim 6, wherein the input time sequence is corresponding to the video signal.

8. The frame synchronization method of claim 1, wherein the delay time is adjusted such that format of the destination frame meets a specific requirement.

9. A frame synchronization device, comprising:
    a time sequence generator generating an output time sequence according to a delay time and an input time sequence corresponding to at least one source frame, wherein the source frame comprises a first input frame having a first time sequence and a second input frame having a second time sequence, and the time sequence generator comprises:
        a multiplexer selecting one of the first and the second time sequences as the input time sequence; and
    a frame buffer, coupled to the time sequence generator, for temporarily storing input data of the source frame according to the input time sequence and outputting output data of a destination frame according to the output time sequence, wherein the output data is corresponding to the input data;
    wherein an average frame rate of the source frame is the same as that of the destination frame.

10. The frame synchronization device of claim 9, wherein the time sequence generator delays the input time sequence according to the delay time to generate a delayed time sequence, and generates the output time sequence according to the delayed time sequence.

11. The frame synchronization device of claim 9, wherein the time sequence generator generates the output time sequence according to the input time sequence and delays the output time sequence with the delay time.

12. The frame synchronization device of claim 9, wherein the input data of the source frame is temporarily entirely stored within the delay time.

13. The frame synchronization device of claim 9, wherein the time sequence generator further comprises:
    a pixel counter counting the number of pixels of a horizontal line of the destination frame to generate a line synchronization output signal;
    a line counter, coupled to the pixel counter, for counting the number of horizontal lines of the destination frame to generate a field synchronization output signal; and
    a data enabling generator, coupled to the pixel counter and the line counter, for generating an output data enabling signal.

14. The frame synchronization device of claim 9, wherein the frame synchronization device further comprises a timer for generating the delay time, and the time sequence generator comprises:
    a delay circuit receiving the input time sequence and delaying the input time sequence with the delay time to generate the output time sequence.

15. The frame synchronization device of claim 9, wherein the first input frame is corresponding to a video signal, and the selected input time sequence is the first time sequence.

16. The frame synchronization device of claim 9, wherein the frame buffer comprises a first and a second buffering regions respectively corresponding to the first and the second input frames for temporarily storing the input data of the frames.

17. The frame synchronization device of claim 9, further comprising:
    a combination circuit for combining the data from the first and the second buffering regions to generate the output data of the destination frame.

18. The frame synchronization device of claim 9, wherein the delay time is adjusted such that format of the destination frame meets a specific requirement.

19. The frame synchronization device of claim 9, further comprising:
    a scaling circuit, coupled to the frame buffer, for scaling the data stored in the frame buffer to generate the output data of the destination frame.

* * * * *